March 8, 1927.  E. L. SCHELLENS ET AL  1,620,491
SPRING SUPPORT
Filed Dec. 14, 1923
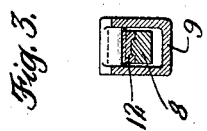
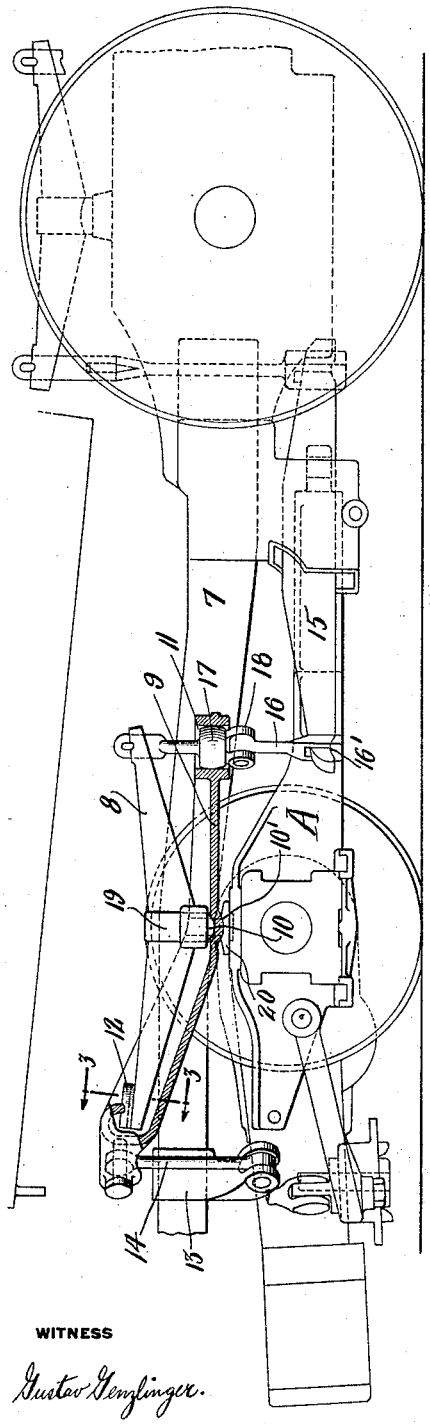
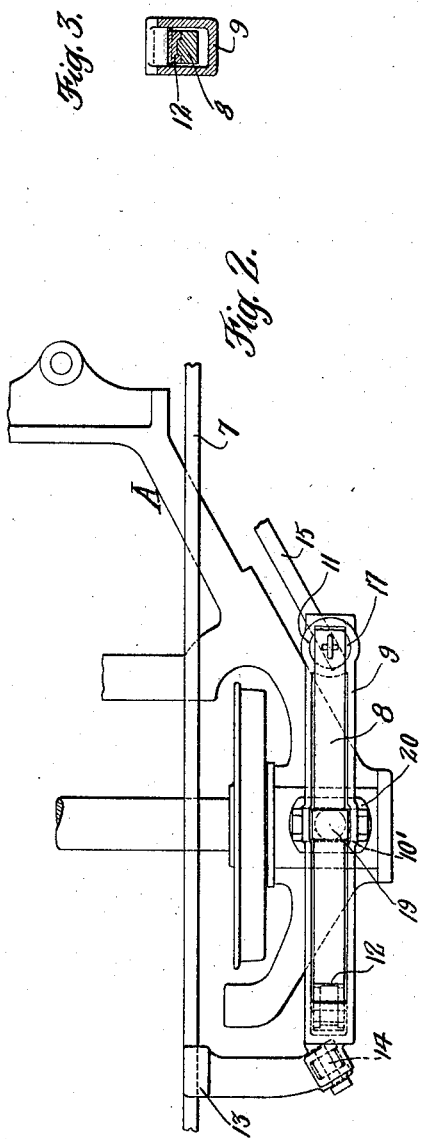
WITNESS
Gustav Genzlinger.
INVENTORS
E. L. Schellens
J. S. Coffin Jr.
BY their ATTORNEYS
Synnestvedt & Lechner Patented Mar. 8, 1927.

1,620,491

UNITED STATES PATENT OFFICE.

EUGENE L. SCHELLENS, OF POINTE CLAIRE, QUEBEC, CANADA, AND JOEL S. COFFIN, JR., OF LISBON, NEW HAMPSHIRE, ASSIGNORS, BY DIRECT AND MESNE ASSIGNMENTS, TO C-S ENGINEERING COMPANY, A CORPORATION OF DELAWARE.

SPRING SUPPORT.

Application filed December 14, 1923. Serial No. 680,637.

This invention relates to spring supports for railway vehicles and is particularly useful in connection with trucks, such, for example, as the trailing trucks of locomotives.

One of the primary objects of our invention is the provision of a simple and effective means whereby the springs are not subjected to twisting or distorting stresses when the truck swings during curving.

The foregoing, together with such other objects as may hereinafter appear, or are incident to our invention, we accomplish by means of a construction which we have illustrated in preferred form in the accompanying drawings, wherein:

Fig. 1 is a diagrammatic side elevation of portions of the locomotive and truck necessary to illustrate our invention, part of the spring support being shown in cross section;

Fig. 2 is a fragmentary plan view illustrating our improvement;

Fig. 3 is a section taken on the lines 3—3 of Fig. 1.

Referring now to Fig. 1 the reference numeral 7 indicates the main frame or the rear extension of the main frame of the locomotive, while the reference character A indicates the radial or trailer truck which supports a portion of the load of the locomotive superstructure through the medium of the springs 8 of which there is one on each side of the truck.

The spring supporting means which we prefer to employ are of a character such as will permit the springs to move with the truck as it swings without, however, imposing any twisting stresses thereon, while at the same time a portion of the weight of the locomotive superstructure is transmitted through such springs to the truck.

To this end we provide a spring supporting member proper, 9, which has a central ball-like seat 10 in its upper face, a transverse cylindrical surface 10″ on its lower face, and an eye 11 at its forward end, the rear end of the spring support bearing on the rear end of the spring through the medium of an interposed shoe 12. A laterally projecting bracket 13 is secured to the main frame and the bracket and the rear end of the spring support 9 are connected through the medium of the substantially vertically disposed link 14, pivoted at its ends to the spring support and bracket, respectively. The pivotal points are so disposed as to permit the links to swing in a line substantially tangent to a circle described by the truck as the latter swings.

The forward end of the spring 8 is connected to the usual equalizer mechanism 15 by means of the hanger 16 such hanger, however, having a ball-like portion 17 fitting within the eye 11 of the spring support 9 and being provided therebelow with a joint 18, permitting the lower portion of the hanger to swing in a line tangent to a circle described by the truck when swinging.

The springs are provided with the usual spring clips and seats 19 adapted to seat in the cupped upper face or seat portion 10 of the spring support, while interposed between the spring support and the truck is a seat member 20 which is trunnioned in the truck which is provided on its upper face with a concave surface complementary to the cylindrical surface 10′.

It will, of course, be understood that each spring is provided with the spring support arrangement just above described. The weight is transmitted to the springs through the links 14 and the hangers 16.

The operation is as follows:

In curving, the truck swings relative to the main frame and carries with it the spring supports 9 and the springs 8. The links 14 and the lower portions of the hangers 16 assume an angular position from the vertical, the angular displacement, however, being relatively slight, but since the pull of the links 14 is on the supports 9 and the pull of the lower portions of the hangers 16 is substantially vertically downward on the upper portions thereof, and since the latter are free to adjust themselves in the slight amount required, there is no twisting of the springs. The portions 16 are free to tilt slightly with respect to the equalizer beams, for which purpose rounded seats 16′ are provided.

As the hangers 14 and 16 are displaced from the vertical, a centering effort is exerted tending to pull the truck to normal position.

As relative vertical motion takes place between the main frame and the truck, the spring supports 9 rock in a substantially vertical plane on the cylindrical surfaces 10' which are normal to the main frame and of sufficient length to restrain the spring supports from tilting or rocking in a transverse direction, the eyes 11 shifting vertically a slight amount with respect to the portion 17 of the equalizer hangers. The trunnions allow relative angular movement with respect to the truck frame. As the springs flatten, the shoes 12 shift longitudinally, compensating for the slight elongation of the springs when this occurs.

The arrangement dispenses with any friction plates or similar members which have been heretofore employed.

Other advantages will occur to those familiar with the art.

We claim:

1. In combination, a locomotive having a main frame, a load carrying truck adapted to swing with respect thereto, a weight transmitting spring, a spring supporting member, and connecting means for the spring for the transmission of weight, cooperating with the supporting member and permitting the spring to move with the truck relative to the main frame without distortion of the spring.

2. In combination, a locomotive having a main frame, a load carrying truck adapted to swing with respect thereto, a weight transmitting spring, a combined spring support and means transmitting weight to the spring, and pivotal means connecting said means to the main frame.

3. In combination, a locomotive having a main frame, a load carrying truck adapted to swing with respect thereto, a weight transmitting spring, a combined spring support and means transmitting weight to the spring, and a link connecting said means to the main frame.

4. In combination, a locomotive having a main frame, a load carrying truck adapted to swing with respect thereto, a weight transmitting spring, a combined spring support and means transmitting weight to the spring, and a link connecting said means to the main frame and set substantially tangent to a circle described by the truck in moving.

5. In combination, a locomotive having a main frame, a load carrying truck adapted to swing with respect thereto, a weight transmitting spring, having one end connected to the equalizer mechanism of the locomotive, a member movable with the truck and connected with the other end of the spring, and a link connecting said member with the main frame for the transmission of weight.

6. In combination, a locomotive having a main frame, a load carrying truck adapted to swing with respect thereto, a weight transmitting spring, a spring support interposed between the truck and spring and mounted for rocking movement in a substantially vertical plane, said support transmitting weight to an end of the spring, and a connection between said support and the main frame.

7. In combination, a locomotive having a main frame, a load carrying truck adapted to swing with respect thereto, a weight transmitting spring, a spring support between the spring and the truck and having an eye at one end, an equalizer hanger for an end of the spring and passing through said eye, and means connecting the other end of the support to the main frame.

8. In combination, a locomotive having a main frame, a load carrying truck adapted to swing with respect thereto, a weight transmitting spring, a spring support between the spring and the truck and having an eye at one end, an equalizer hanger for an end of the spring and passing through said eye, and means connecting the other end of the support to the main frame, said hanger having a joint intermediate its ends.

9. In combination, a locomotive having a main frame, a load carrying truck adapted to swing with respect thereto, a weight transmitting spring, a spring support between the spring and the truck and having an eye at one end, an equalizer hanger for an end of the spring and passing through said eye, and means connecting the other end of the support to the main frame, said support having a cylindrical seating surface.

10. In combination, a locomotive having a main frame, a truck, a weight transmitting spring, spring equalizer means, and a spring support operatively associated with the equalizer means.

11. In locomotive truck structures, the combination of a spring, and a spring supporting member directly cooperating with one end of said spring and indirectly with the other end to prevent distortion of the spring during swinging of the truck.

12. In locomotive truck structures, a spring supporting member, having a spring supporting socket, a portion adapted to engage one end of the spring and an equalizer link engaging portion, said portions cooperating with the ends of the spring to prevent distortion thereof during swinging of the truck.

13. In combination with a locomotive and its main frame, a truck, a weight transmitting spring, a spring supporting member, spring equalizer means transmitting weight to one end of said spring, and a bracket adapted to transmit weight through said supporting member to the other end of the spring.

14. In a railway vehicle having a truck, the combination of a weight-transmitting spring, and a support for preventing distortion thereof, comprising a member rockingly engaged by the truck and the spring at a point intermediate its ends and having one end engaging an end of the spring with freedom of flexure of the spring in a plane substantially the same as that in which the support rocks.

15. The combination of a railway vehicle, a truck capable of movement relative thereto, a leaf spring for transmitting load from the vehicle to the truck, and a distortion preventing support for said spring mounted on the truck for rocking movement in substantially the direction of spring flexure and engaging an end of the spring with freedom to permit said rocking and said flexure.

16. In a locomotive, a main frame, a radial truck, a spring, a spring support mounted at a point intermediate its ends for rocking movement in a vertical plane on an axis at said intermediate point, and means connecting the support to the main frame.

17. The combination, with a railway vehicle having a main frame, a truck, and a weight transmitting spring, of a spring-supporting member mounted on the truck and adapted to transmit weight from the frame to the spring, and a sliding member interposed between the spring and the supporting member.

18. In a railway vehicle having a main frame, a truck and a weight-transmitting spring, the combination of a spring-support, means adapted to transmit weight thereto from the main frame, and a slidable member adapted to transmit weight from the support to the spring.

19. The combination, with a railway vehicle having a main frame, a truck and a spring, of a combined spring support and means transmitting weight to the spring; said combined support and weight-transmitting means comprising a member mounted on the truck for rocking movement at the point of spring-support and having a connection at an end to the main frame, and a sliding member mounted on the spring and adapted to transmit weight thereto from the rocking member.

In testimony whereof, we have hereunto signed our names.

E. L. SCHELLENS.
J. S. COFFIN, Jr.